United States Patent
Grosjean et al.

(10) Patent No.: US 12,147,611 B2
(45) Date of Patent: Nov. 19, 2024

(54) METHOD FOR SENSING A DISPLACEMENT OF A POINTING DEVICE

(71) Applicant: EM Microelectronic-Marin SA, Marin (CH)

(72) Inventors: Sylvain Grosjean, Les Fins (FR); Jérémy Schlachter, Gampelen (CH)

(73) Assignee: EM Microelectronic-Marin SA, Marin (CH)

( * ) Notice: Subject to any disclaimer, the term of this patent is extended or adjusted under 35 U.S.C. 154(b) by 0 days.

(21) Appl. No.: 18/257,175

(22) PCT Filed: Dec. 14, 2021

(86) PCT No.: PCT/EP2021/085629
§ 371 (c)(1),
(2) Date: Jun. 13, 2023

(87) PCT Pub. No.: WO2022/129006
PCT Pub. Date: Jun. 23, 2022

(65) Prior Publication Data
US 2024/0036655 A1    Feb. 1, 2024

(30) Foreign Application Priority Data
Dec. 14, 2020 (EP) .................................. 20213897

(51) Int. Cl.
*G06F 3/03* (2006.01)

(52) U.S. Cl.
CPC .................................. *G06F 3/0304* (2013.01)

(58) Field of Classification Search
CPC ........... G06F 3/0304–0325; G06F 3/042–0428
See application file for complete search history.

(56) References Cited

U.S. PATENT DOCUMENTS

2010/0295773 A1* 11/2010 Alameh ................ G06F 3/0304
                                                          715/863
2012/0274606 A1    11/2012 Song et al.

OTHER PUBLICATIONS

International Search Report issued Mar. 17, 2022 in PCT/EP2021/085629 filed on Dec. 14, 2021, 2 pages.

* cited by examiner

*Primary Examiner* — Lisa S Landis
(74) *Attorney, Agent, or Firm* — Oblon, McClelland, Maier & Neustadt, L.L.P.

(57) ABSTRACT

In a method for sensing a displacement of a pointing device, like a mouse, said pointing device includes at least one light source configured to illuminate a surface, at least one first secondary photodetector, at least one second secondary photodetector, and at least one primary photodetector. Each individual value of the photodetectors is weighted and compared such as to sense said displacement of the pointing device.

11 Claims, 1 Drawing Sheet

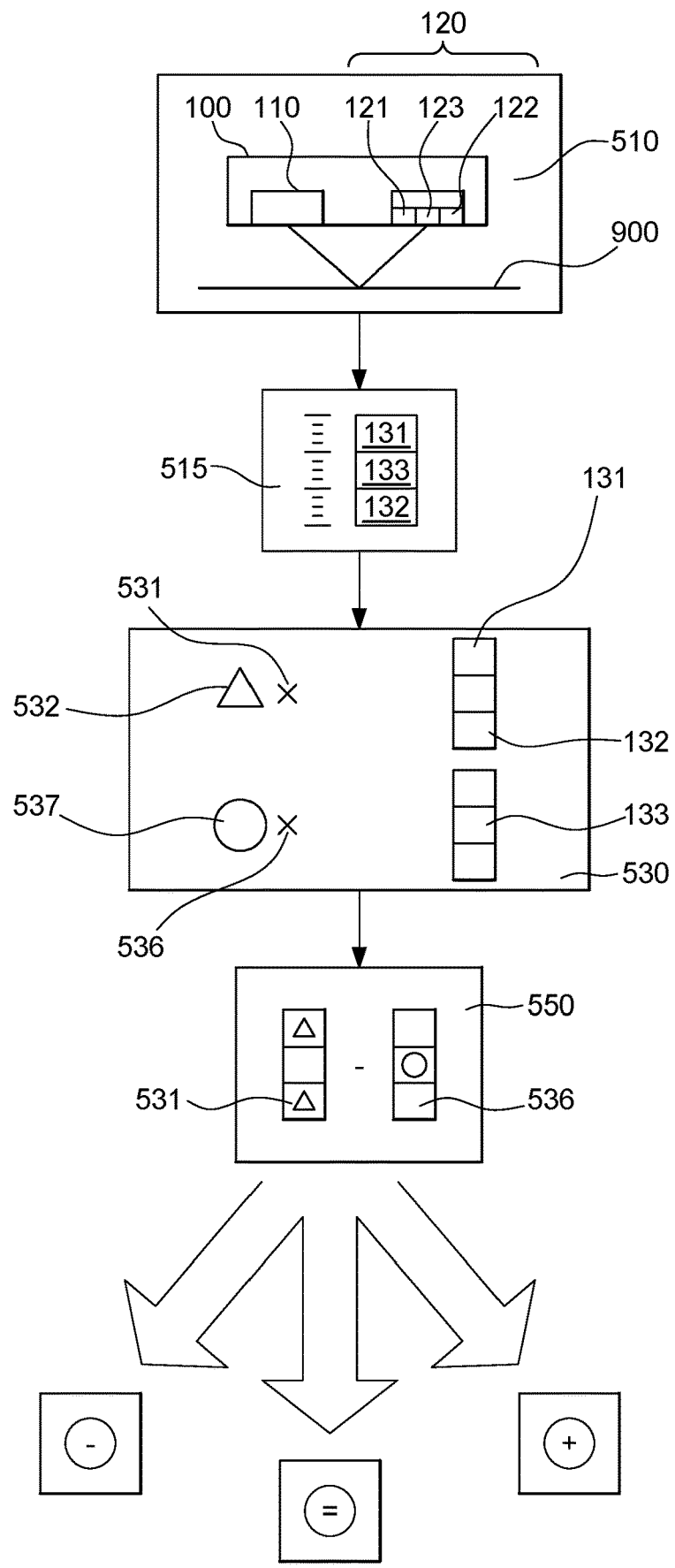

METHOD FOR SENSING A DISPLACEMENT OF A POINTING DEVICE

TECHNICAL FIELD

The present invention generally relates to pointing devices, in particular for controlling the position of a cursor on a screen, such as the display of a personal computer, workstation or other computing devices having a graphic user interface. Such pointing devices may for instance include mice, trackballs and other computer peripherals for controlling the position of a cursor on a display screen.

The present invention more particularly relates to the field of optical pointing devices which comprise an optical motion sensing device including a photodetector array for measuring the varying intensity pattern of a portion of a surface which is illuminated with radiation of a light source and for extracting information about the relative motion between the photodetector array and the illuminated portion of the surface.

STATE OF THE ART

Optical pointing devices incorporating a light source are already known in the art. Such light source allows optical pointing devices such as mice to work on a much wider variety of surfaces. However, the light results in a received image that contains generally high spatial frequencies especially.

This high frequency content leads to spatial aliasing due to beyond undersampled (in the spatial domain). This aliasing leads to several bad effects, such as loss of resolution or apparent "reverse" motion (the "wagon-wheel in motion pictures" effect). One alternative to deal with the higher spatial frequency content is to create smaller pixels (higher spatial capability in the imager). But, two major problems arise with smaller pixels that are a lower mouse-speed/acceleration capability and a lower sensitivity to light (less collection area in the pixel).

SUMMARY OF THE INVENTION

The present invention relates to a method for sensing a displacement of a pointing device; said pointing device comprising at least one light source configured to illuminate a surface, a plurality of photodetector; said plurality of photodetector comprising at least one first secondary photodetector, at least one second secondary photodetector and at least one primary photodetector and each photodetector comprises at least one first secondary value, at least one second secondary value and at least one primary value respectively; said method comprising at least one:
  Sensing reflected light by said surface via said plurality of photodetector;
  Weighting of said at least one first secondary value, said at least one second secondary value and/or said at least one primary value; and,
  Comparison of said at least one weighting, said at least one second secondary value and/or said at least one primary value.

Thanks to the arrangement, said method may reveal interesting information when surface local non-uniformity is smaller than the spot gradient and may generate dynamics edges, such as to recognize a moving image and thus improve mouse displacement evaluation.

According to an embodiment, said at least one sensing comprises at least one measuring of sensed reflected light by said at least one first secondary value, said at least one second secondary value and said at least one primary value.

According to an embodiment, said at least one weighting comprises a first secondary multiplication of at least two value among said at least one first secondary value, said at least one second secondary value and said at least one primary value by a first secondary number and a second secondary multiplication of at least one value among said at least one first secondary value, said at least one second secondary value and said at least one primary value by a second secondary number.

According to an embodiment, said first secondary multiplication comprises a multiplication of said at least one first secondary value by said first secondary number and said at least one second secondary value by said first secondary number, and/or said second secondary multiplication comprises a multiplication of said at least one primary value by said second secondary number.

Thanks to one of those embodiments, said values may be weighted such as to reveal interesting information when surface local non-uniformity is smaller than the spot gradient and to generate dynamics edges.

According to an embodiment, said at least one comparison comprises a comparison of said first secondary multiplication and said second secondary multiplication.

According to an embodiment, said second secondary number is a multiple of said first secondary number, preferably said second secondary number is a double of said first secondary number.

According to an embodiment, said at least one primary photodetector is comprised between said at least one first secondary photodetector, and said at least one second secondary photodetector.

Thanks to one of those embodiments, said method may generate dynamics edges and may remove gradient without calibration or temporal filtering.

BRIEF DESCRIPTION OF THE DRAWINGS

The foregoing and other purposes, features, aspects and advantages of the invention will become apparent from the following detailed description of the embodiments, given by way of illustration and not limitation with reference to the accompanying drawings, in which FIG. 1 illustrates a method 500 for sensing 510 a displacement of a pointing device 100.

DESCRIPTION OF THE INVENTION

The present invention relates to a method 500 for sensing 510 a displacement of a pointing device 100 as depicted in FIG. 1.

Said pointing device 100 comprises at least one light source 110 configured to illuminate a surface 900 and a plurality of photodetector 120. Said plurality of photodetector 120 may comprise at least one first secondary photodetector 121, at least one second secondary photodetector 122 and at least one primary photodetector 123, more specifically said at least one primary photodetector 123 is comprised between said at least one first secondary photodetector 121, and said at least one second secondary photodetector 122 as depicted in FIG. 1.

Further, each photodetector comprises at least one first secondary value 131, at least one second secondary value 132 and at least one primary value 133. Indeed, said plurality of photodetector 120 may sense 510 reflected light by said surface 900 and said reflected light may be measured 515 such as to be memorized into said at least one first secondary value 131, said at least one second secondary value 132 and said at least one primary value 133.

Thereafter, said at least one first secondary value 131, said at least one second secondary value 132 and/or said at least one primary value 133 may be weighted 530, such as to reveal interesting information when surface local non-uniformity is smaller than the spot gradient and to generate dynamics edges.

Said at least one weighting 530 may comprise a first secondary multiplication 531 of said at least one first secondary value 131 by said first secondary number 532 and of said at least one second secondary value 132 by said first secondary number 532. The same may occur with said at least one primary value 133, i.e. a second secondary multiplication 536 of said at least one primary value 133 by a second secondary number 537 such as to reveal dynamics edges.

According to one aspect of said at least one weighting 530 is said second secondary number 537 is a multiple of said first secondary number 532. More specifically, the sum of said plurality of photodetector 120 less said at least one primary photodetector 123 may be served to divided to give said second secondary number 537 such as to give said first secondary number 532. For instance, if the number of said plurality of photodetector 120 may be equal to 3, 5 or 9, the sum of said plurality of photodetector 120 less said at least one primary photodetector 123 may be equal to 2, 4 or 8 respectively, and if said second secondary number 537 is equal to 16 for example, said first secondary number 532 may be equal to 8, 4, or 2 respectively.

This may be followed by at least one comparison 550 between said first secondary multiplication 531 and said second secondary multiplication 536 such as to generate dynamics edges and may remove gradient without calibration or temporal filtering.

Indeed, the outcome of said at least one comparison 550 may be negative if said first secondary multiplication 531 is higher than said second secondary multiplication 536. Inversely, the outcome of said at least one comparison 550 may be positive if said first secondary multiplication 531 is smaller than said second secondary multiplication 536 and in case where said first secondary multiplication 531 and said second secondary multiplication 536 may be equal, the outcome of said at least one comparison 550 may be neutral.

The invention claimed is:

1. A method for sensing a displacement of a pointing device, said pointing device comprising at least one light source configured to illuminate a surface, a plurality of photodetectors, said plurality of photodetectors comprising at least one first secondary photodetector, at least one second secondary photodetector, and at least one primary photodetector, each photodetector including at least one first secondary value, at least one second secondary value, and at least one primary value, respectively, said method comprising at least one:

sensing light reflected by said surface via said plurality of photodetectors;

weighting said at least one first secondary value, said at least one second secondary value, and/or said at least one primary value; and comparing said at least one weighting, said at least one second secondary value, and/or said at least one primary value.

2. The method according to claim 1, wherein said sensing comprises at least one measuring of the sensed light reflected by said at least one first secondary value, said at least one second secondary value, and said at least one primary value.

3. The method according to claim 2, wherein said at least one weighting comprises a first secondary multiplication of at least two values among said at least one first secondary value, said at least one second secondary value, and said at least one primary value by a first secondary number, and a second secondary multiplication of at least one value among said at least one first secondary value, said at least one second secondary value, and said at least one primary value by a second secondary number.

4. The method according to claim 3, wherein said first secondary multiplication comprises a multiplication of said at least one first secondary value by said first secondary number and said at least one second secondary value by said first secondary number, and/or said second secondary multiplication comprises a multiplication of said at least one primary value by said second secondary number.

5. The method according to claim 3, wherein said at least one comparing comprises a comparison of said first secondary multiplication and said second secondary multiplication.

6. The method according to claim 3, wherein said second secondary number is a multiple of said first secondary number.

7. The method according to claim 1, wherein said at least one primary photodetector is disposed between said at least one first secondary photodetector and said at least one second secondary photodetector.

8. The method according to claim 6, wherein said second secondary number is a double of said first secondary number.

9. The method according to claim 1, wherein said weighting uses a secondary number.

10. The method according to claim 1, wherein the weighting comprises multiplying said at least one first secondary value, said at least one second secondary value, and/or said at least one primary value by a secondary number.

11. The method according to claim 3, wherein a quotient of said second secondary number by said first secondary number is a sum of said plurality of photodetectors less said at least one primary photodetector.

* * * * *